W. M. WHEILDON.
METHOD OF WRAPPING AND MEANS FOR PRACTISING THE SAME.
APPLICATION FILED APR. 6, 1918.
1,400,116. Patented Dec. 13, 1921.
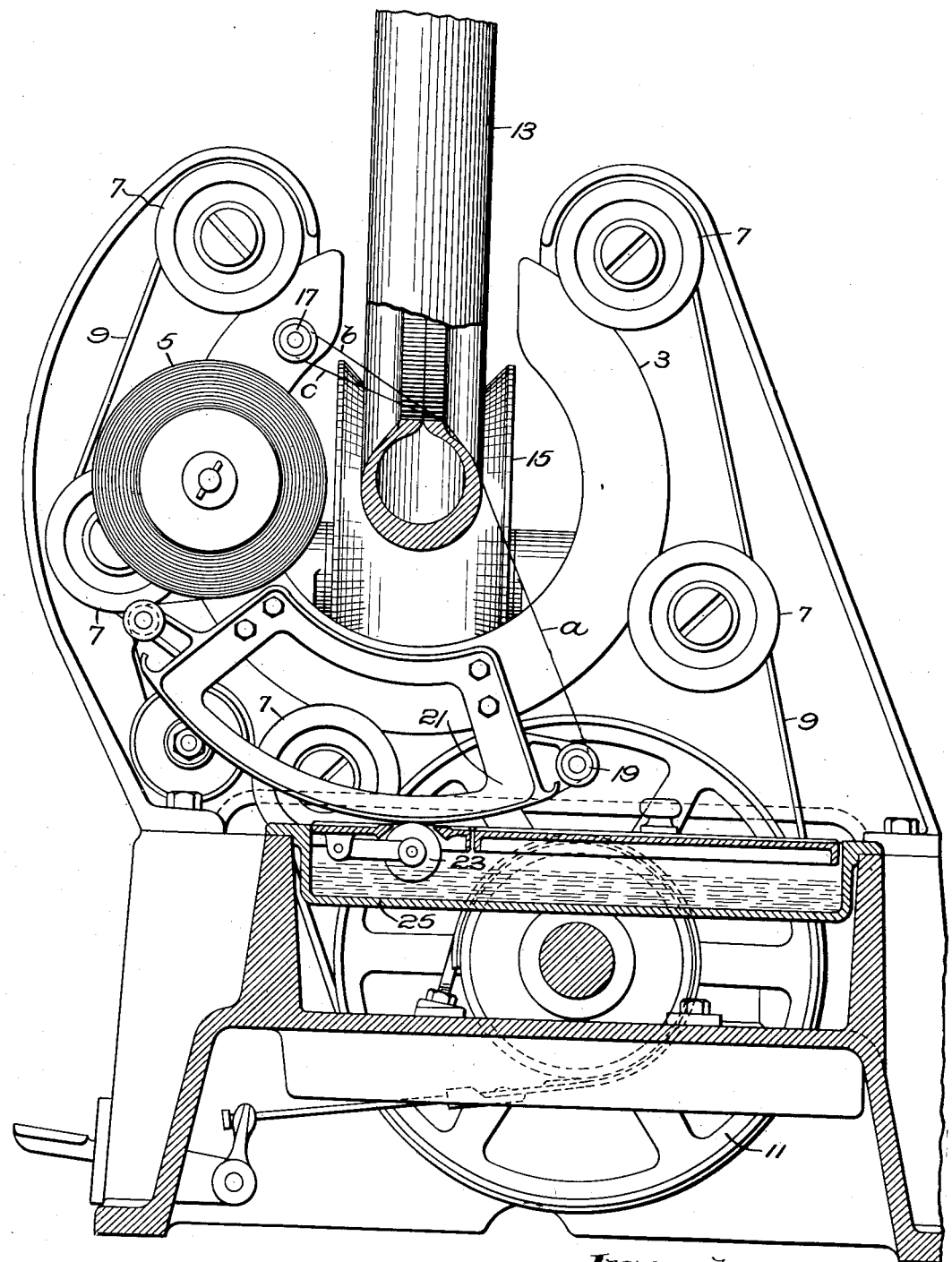
Inventor:
William M. Wheildon.
by Fleury, Boutts, Furney & Furney
Attys

UNITED STATES PATENT OFFICE.

WILLIAM M. WHEILDON, OF ASHLAND, MASSACHUSETTS, ASSIGNOR TO EDWARD H. ANGIER, OF FRAMINGHAM, MASSACHUSETTS.

METHOD OF WRAPPING AND MEANS FOR PRACTISING THE SAME.

1,400,116.   Specification of Letters Patent.   Patented Dec. 13, 1921.

Application filed April 6, 1918. Serial No. 227,098.

*To all whom it may concern:*

Be it known that I, WILLIAM M. WHEILDON, a citizen of the United States, and resident of Ashland, in the county of Middlesex and State of Massachusetts, have invented an Improvement in Methods of Wrapping and Means for Practising the Same, of which the following description, in connection with the accompanying drawings, is a specification, like characters on the drawings representing like parts.

This invention relates to a method of wrapping and means for practising the same. My invention is applicable to any instance where material is wound in a number of turns or convolutions, whether superposed or merely overlapping, and whether the purpose of the winding is to provide an inclosing covering or wrapping or otherwise. For convenience, however, I shall here describe it as utilized in connection with the preparation of a package by winding material about an article and, still more specifically, to the inclosing of the tire within a covering formed by a helically applied strip of paper or the like.

My invention will best be understood by reference to the following description taken in connection with the accompanying drawing wherein for the purpose of specifically disclosing an illustrative embodiment of my invention I have shown as much of a tire wrapping machine as is necessary for an understanding thereof.

Referring to the drawing, the machine shown is of a type not novel to this application and embodies in its construction an annular shuttle 3 carrying a suitable supply of wrapping material such as the roll 5 of paper strip. The shuttle 3 may be supported on rolls 7 and rotated in any desired manner as by means of the belt 9 and driving wheel 11. The wrapping strip is led from the roll 5 to the tire 13 supported on rolls 15 and by the relative rotation of object and supply, which in this instance is effected by the rotation of the shuttle about the transverse section of the tire, the strip is drawn from the supply and wrapped about the object. It will be understood that the roll 15 may be driven in any desired manner to revolve the tire 13 and that thus the wrapping is applied as a helix about the tire. Machines operating on this principle were well known prior to my invention and I describe this one solely by way of an example.

The strip leads to the tire 13 from the shuttle over a roll 17 and in accordance with my invention the course of the strip between the roll 5 and the delivery means, such as the roll 17, is such as to provide a run of the paper formed by the parts $a$ and $b$ in the drawing which extends from one side of the tire to the other and in particular in the present embodiment extends chord-like across the shuttle. This may be effected as in the device shown by providing an intermediate guide such as the roll 19 between the supply roll 5 and delivery roll 17. The connecting line between the rolls 17 and 19 is such that it would cut the tire when the latter is in position and the run of the paper formed by the parts $a$ and $b$ is thus somewhat displaced and bears frictionally against the article and may engage it throughout an extended arc. The portion of the paper $c$ leads from the delivery roll 17 to the object and engages the latter between it and the run of paper $a$—$b$. Thus, when the wrapping operation is under way, the portion $c$ of the paper is wrapped around the tire, moving toward the right in the position shown, while the run of paper $a$—$b$ moving to the left bears thereon and wipes or presses the same down into firm contact with the tire or like object and smoothes out the various convolutions thereof. Otherwise described, it may be said that the paper is applied in the form of a loop $c$—$b$ formed over the roll 17 and having a closed end where the two branches $b$ and $c$ engage the tire 13 in superposed relation. This loop is wrapped about the tire counterclockwise, viewing the figure, and the portion $c$ forms wrapping turns about the tire while the portion $b$ presses the same down. It is of course understood that the material at the parts $a$, $b$ and $c$ is constantly changing, the strip feeding longitudinally. These letters might almost be said to indicate positions rather than physical parts.

In the drawing I have illustrated a machine which is adapted to apply a sealed wrapping. While not limited thereto, my invention is useful in handling material which is to be secured with adhesive as in such a wrapping machine. Referring to the drawing, it will be seen that the strip is led over an arc-shaped supporting surface 21 between the supply roll 5 and the guide roll 19, and while supported on this surface is adapted to make contact with a moistener roll 23 running in a tank 25 which may either contain suitable adhesive or water adapted to moisten dried adhesive already on the strip. Equally well, of course, the liquid in the tank might be to give the strip other qualities than that of adhesion. It will be noted that in the device shown the under part of the portion $c$ of the strip is the moistened part and it is therefore adapted to adhere to a prior convolution of wrapping material or to the object about which the strip is wrapped if such is the intention. The outer parts of the portions $a$ and $b$ of the strip, however, are those which are moist and thus the moist adhesive does not interfere with the wiping action.

The utilization of the strip itself as a wiper as described provides, without the addition of any extra parts, for a thorough pressing together of the parts which are to cohere. The travel of the strip throughout the run $a$—$b$ prevents the smeared side thereof from being pressed down too soon and furthermore, the interaction of the several parts provides for an even stretching of the paper. When paper is moistened with certain liquids it is subject to a certain amount of stretch and this is cared for both by the displacing pull on the run $a$—$b$ and by the ironing out action of that run on the convolution just applied to the tire. A firm, smooth application of the material is thus assured and, if it is used for packaging, when the adhesive dries the paper may shrink and provide an exceedingly close fitting cover.

I have described in considerable detail the application of my invention as embodied in a tire wrapping machine such as disclosed wherein the supply of material revolves about the object which is to be wrapped and wherein the object is to be inclosed in the wrapping. It will be understood, however, that I have done this simply by way of an example and that my invention is not limited to this use or to a movable supply or to the provision of wrappings in the sense of inclosing coverings. What I do claim and desire to secure by Letters Patent is:—

1. An installation for wrapping material about an object comprising a material supply, a material guide, the material from said supply leading from a point on one side of the object to a point at the opposite side of the object, providing a part between such points bearing on the object, leading at said opposite side over the guide and thence in the opposite direction back to the object in superposed relation to the part of the wrapping already thereon, providing a loop over the guide having a closed mouth provided by superposition of the two branches thereof on the article and means to effect relative rotation of object and supply.

2. The method of wrapping material on an object characterized by training the material from one side to the other of the object to provide a run thereof bearing thereagainst and then back leading to the object in the opposite direction between the same and such run.

In testimony whereof I have signed my name to this specification.

WILLIAM M. WHEILDON.